(12) United States Patent
Warren et al.

(10) Patent No.: US 10,157,177 B2
(45) Date of Patent: Dec. 18, 2018

(54) SYSTEM AND METHOD FOR EXTRACTING ENTITIES IN ELECTRONIC DOCUMENTS

(71) Applicant: Kira Inc., Toronto (CA)

(72) Inventors: Robert Henry Warren, Toronto (CA); Alexander Karl Hudek, Toronto (CA)

(73) Assignee: KIRA INC., Toronto (CA)

( * ) Notice: Subject to any disclaimer, the term of this patent is extended or adjusted under 35 U.S.C. 154(b) by 0 days.

(21) Appl. No.: 15/336,999

(22) Filed: Oct. 28, 2016

(65) Prior Publication Data

US 2018/0121413 A1    May 3, 2018

(51) Int. Cl.
*G06F 17/21* (2006.01)
*G06F 17/27* (2006.01)

(52) U.S. Cl.
CPC ............ *G06F 17/278* (2013.01); *G06F 17/21* (2013.01); *G06F 17/277* (2013.01); *G06F 17/2785* (2013.01)

(58) Field of Classification Search
USPC ....................................................... 704/7–10
See application file for complete search history.

(56) References Cited

U.S. PATENT DOCUMENTS

| | | | |
|---|---|---|---|
| 2006/0123000 A1* | 6/2006 | Baxter | G06F 17/3061 |
| 2014/0046653 A1* | 2/2014 | Gopalakrishnan | G06F 17/28 704/9 |
| 2014/0180676 A1* | 6/2014 | Hillard | G06F 17/278 704/9 |
| 2015/0286629 A1* | 10/2015 | Abdel-Reheem | G06F 17/2827 704/9 |

* cited by examiner

*Primary Examiner* — Leonard Saint Cyr
(74) *Attorney, Agent, or Firm* — Elan IP Inc.

(57) ABSTRACT

A method for entity extraction within an electronic document including executing by a computer processor a conditional random field algorithm stored on a computer readable medium to generate a conditional random field model; the conditional random field algorithm having an input including one or more training text documents; executing by a computer processor an entity extraction algorithm stored on a computer readable medium to generate an entity extraction model; the entity extraction algorithm having an input including the same one or more training text documents input into the conditional random field algorithm; applying by a computer processor the conditional random field model to at least one electronic document; wherein application of the conditional random field model returns a list of passages in the at least one electronic document having an entity; applying by a computer processor the entity extraction model to the at least one electronic document; wherein application of the entity extraction model returns a list of entities; and storing the list of entities on a compute readable medium.

6 Claims, 4 Drawing Sheets

(PRIOT ART)

400 the examiner found prior art that was effective for raising a novelty objection. art simpson was proud of the prior art located. the applicant, general tire company, was happy the best art was found. the claims were amended to limit the scope of the invention. a strong patent was thought to be issued ↓ CRF Model

405 art simpson was proud of the prior art located.

the applicant, general tire company, was happy the best art was found.

↓ Entity Extraction Model

410 art simpson general tire company

FIG. 4

SYSTEM AND METHOD FOR EXTRACTING ENTITIES IN ELECTRONIC DOCUMENTS

TECHNICAL FIELD

The invention relates generally to text locating and retrieval in electronic documents, and more specifically to a method and system for extracting entities in electronic documents using conditional random fields to identify entities based on context.

BACKGROUND

Electronic documents or passages of text otherwise stored electronically (such as stored directly on web pages accessible via the internet) can contain large amounts of information either in a single source or over multiple sources. With regards to electronic documents this is particularly relevant to the review of vast amounts of electronic documents, be it those originally in electronic form or those which have been converted into electronic documents, where particular types of passages or groups of text have to be identified. For example, it could be necessary to search through a document or number of documents to identify entities (typically proper nouns) or passages relating specifically to entities. For example, in legal due diligence, it may be necessary to extract all sentences relating to a specific corporate entity or specific person, who may be referred to in different ways in different documents.

Prior art solutions thus far proposed have focused generally on (a) finding an exact or near match against a list of known entities within the language used in the documents being searched and/or (b) analyzing the grammar and syntax of the document to infer that the tokens being used as nouns may represent entities, the most obvious example of this including identifying capitalized nouns. However, prior art solutions suffer from accuracy issues in that they depend on the presence of tokens (ie. features of the text beyond their linguistic meanings, grammar or syntax) without taking into account the semantic context of an particular phrase. For example, consider the phrase, "That's excellent art". Prior art solutions would not immediately be able to determine whether this phrase is a complement to a person named "Art" or is referring to a compliment paid by a supervisory examiner to a junior examiner in relation to prior art found during a patent search. Similarly, the phrase " . . . in the morning he would wave to the smiths on their way to work . . . " leaves it unclear whether the "smiths" refers to a family or group of tradespeople.

FIG. 1 illustrates the general state of the art in which an entity extraction training algorithm is run on a set of training documents to develop an entity extraction model. This model is then applied iteratively to a set of documents to analyze and a list of the named entities are extracted.

There is accordingly a need in the art for an improved method and system for identifying or extracting entities in electronic documents.

SUMMARY OF THE INVENTION

In one embodiment of the invention, there is provided a method for entity extraction within an electronic document, wherein an entity may be a proper noun; the method including executing by a computer processor a conditional random field algorithm stored on a computer readable medium to generate a conditional random field model; the conditional random field algorithm having an input including one or more training text documents; executing by a computer processor an entity extraction algorithm stored on a computer readable medium to generate an entity extraction model; the entity extraction algorithm having an input including the same one or more training text documents input into the conditional random field algorithm; applying by a computer processor the conditional random field model to at least one electronic document; wherein application of the conditional random field model returns a list of passages in the at least one electronic document having an entity; applying by a computer processor the entity extraction model to the at least one electronic document; wherein application of the entity extraction model returns a list of entities; and storing the list of entities on a compute readable medium.

In one aspect of the invention, the conditional random field model is generated by deconstructing by a computer processor training electronic texts stored on a computer readable into complete sentences and tokens used by the text in each sentence, along with the sequence of sentences; and identifying entities based on either their context within sentences or the tokens used by text in the sentences.

In another aspect of the invention, the steps of generating the conditional random field model and generating the entity extraction model occur simultaneously from a common set of training texts.

In another aspect of the invention, applying the conditional random field model generates a probability of a sentence having an entity; wherein the probability includes a tolerance for words which cannot readily be identified as entities.

In another aspect of the invention, given a document containing multiple sentences $S:\{s_1, s_2, \ldots, s_m\}$ and the corresponding entity label for each sentence Entity:=$\{$entity$_1$, entity$_2$, $\ldots$, entity$_m\}$, the conditional random field function defining the probability of the Entity applied to S, Pr(Entity|S), is expressed as:

$$Pr(\text{Entity}|S) = \frac{1}{Z_S}\exp\left(\sum_{j=1}^{K \times L} F_j(\text{Concept}, S)\right) = \quad (1)$$

$$\frac{1}{Z_S}\exp\left(\sum_{i=1,k=1}^{m,K} \lambda_k f_k(y_{i-1}, y_i, S) + \sum_{i=1,l=1}^{m,L} \mu_l g_l(y_i, S)\right),$$

where $Z_s$ is a normalization constant. $f_k(y_{i-1},y_i,S)$ is an arbitrary feature function over the group of sentences in a document and positions i and i−1. $g_l(y_i,S)$ is a feature function of the state at position i and the document S.

In a second embodiment of the invention, there is provided a system for extracting entities from an electronic document, wherein an entity may be a proper noun; the system including a computer processor executing a conditional random field algorithm stored on a computer readable medium to generate a conditional random field model; the conditional random field algorithm having an input including one or more training text documents; a computer processor executing an entity extraction algorithm stored on a computer readable medium to generate an entity extraction model; the entity extraction algorithm having an input including the same one or more training text documents input into the conditional random field algorithm; a computer processor applying the conditional random field model to at least one electronic document; wherein application of the conditional random field model returns a list of passages in the at least one electronic document having an entity; a computer processor applying the entity extraction model to the at least one electronic document; wherein application of the entity extraction model returns a list of entities; a data storing for storing the list of entities on a compute readable medium.

In another aspect of the invention, the conditional random field model is generated by deconstructing training electronic texts stored on a computer readable into complete sentences and tokens used by the text in each sentence, along with the sequence of sentences; and identifying entities based on either their context within sentences or the tokens used by text in the sentences.

The system is further adapted to carry out the method as herein described.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 shows an example of one application of the invention.

DETAILED DESCRIPTION OF THE INVENTION

Figure 1:
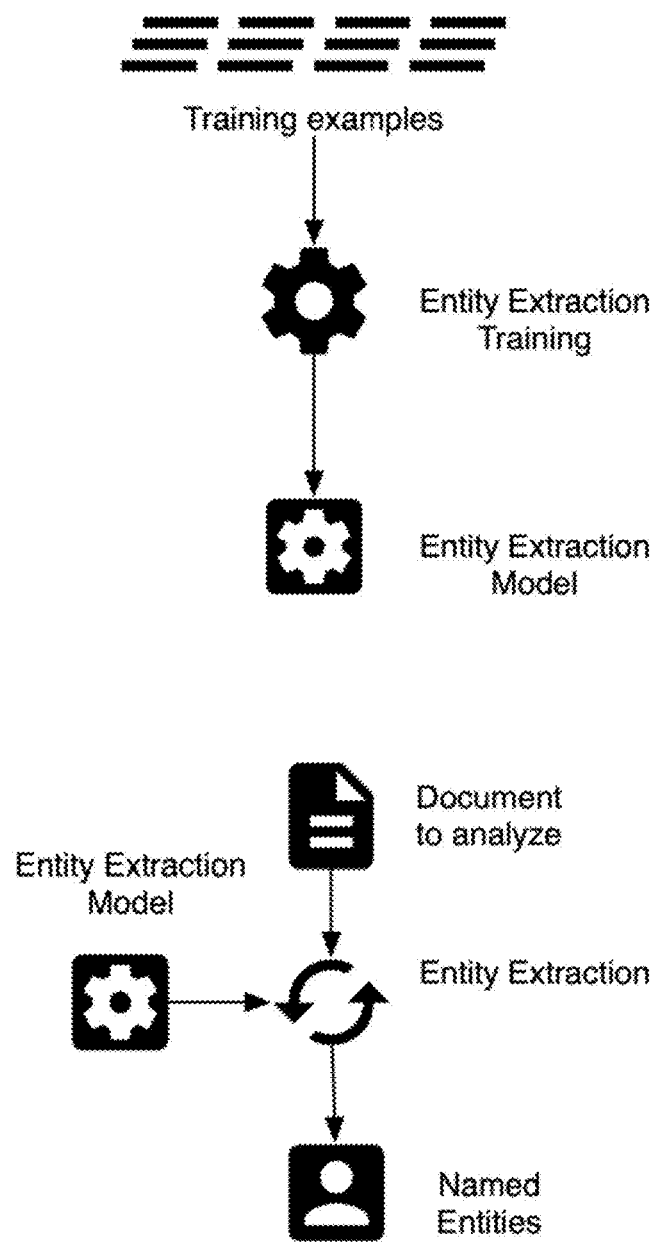
FIG. 1 is illustrative of prior art approaches to entity extraction.

Broadly, the invention as herein described provides for a model that identifies the context of passages using methods which find passages of text before applying an entity extraction model. These passages of text are classified, preferably by a conditional random field classifier as containing a reference to an entity before a conventional entity extraction method is performed over the relevant passage of text instead of over the entire document. For the purposes of this description, an entity is defined as a token of text, usually in the form of a proper noun, but could also take the form of an acronym or identifier that is used to refer to, otherwise represent a person, place or organization. An entity could also be multiple tokens located adjacent each other, which either are themselves a proper noun or an identifier of one, as described above.

This provides an improvement over the prior art in that the retrieval of relevant passages from a document being searched using conditional random fields takes into account neighboring sentences in the selection of the appropriate passage. Prior art methods make this difficult, if not impossible, since it is not always clear what the semantic relationship neighboring sentences have with each other. A conditional random field takes into account the context of neighboring passages without having to compute deep grammar parsing algorithms, which would normally be required, and is often prohibitive due to time or computing power constraints.

Furthermore, the invention as herein described is advantageous in that performance improvement is gained without the need for additional training documents or data. Preferably, the training occurs concurrently on both the conditional random fields and on the entity recognition algorithms. It will be clear that this is beneficial since the same entity training infrastructure and data set can be used.

Prior art approaches would also learn the presence of an entity within an example passage, having no sense or meaning attributed to the context of the passage. Hence should there by two different passages with the same named entity but only one of which is marked as relevant, the method of the invention would extract the entity from both passages, whereas the prior art may not. Prior art methods would fail to differentiate between "Sergeant ordered her soldiers to form up" and "Bill Sergeant lived in a small house in the city" even though one the second example is a valid entity. The use of conditional random fields as herein described would prevent the first passage from being detected as an entity as it would not pass it on as a relevant passage to the entity extraction algorithm.

Reference in this description to text refers to the basic meaning of the term, where text is the plain word or phrase being identified free of its appearance, location or formatting. Tokens are characteristics of text that differentiate certain text from other text within the same document.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

Figure 2:
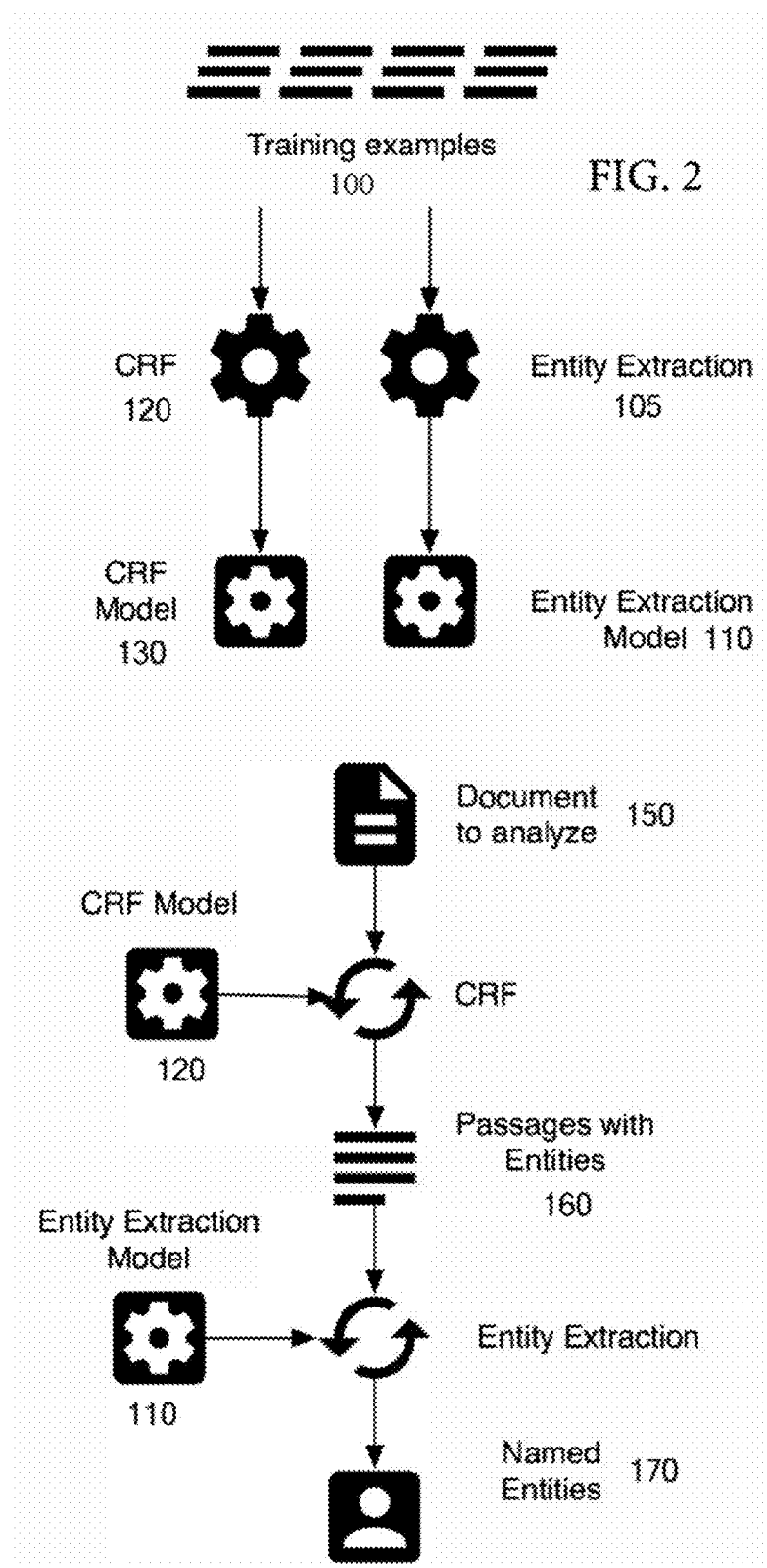
FIG. 2 illustrates the operational flow of one embodiment of the invention.

Referring now to FIG. 2, there is shown one embodiment of the invention. A set of training documents or sample text 100 are imported or otherwise read by a computer system implementing the method. The training text may be a subset of a universe of documents which are later to be searched, or more preferably, are a group of known documents of a similar type to the document being searched. In general, the training sentence could be any relevant text accessible by the computer system which can be mined for known entities. The training text is used to generate an Entity Extraction Model 110. The generation of Entity Extraction Models is known in the art, and thus not described further herein. One example of the development of an Entity Extraction Model can be found in Lev Ratinov and Dan Roth. 2009. *Design challenges and misconceptions in named entity recognition. In Proceedings of the Thirteenth Conference on Computational Natural Language Learning* (CoNLL '09). Association for Computational Linguistics, Stroudsburg, Pa., USA, 147-155, the contents of which are herein incorporated by reference.

The set of training documents 100 is also used by a Conditional Random Field (CRF) algorithm 120 to generate a CRF model 130. Preferably, application of the CRF algorithm 120 to generate the CRF model 130 occurs simultaneously or substantially simultaneously with the created of the Entity Extraction Model 110. The ability to simultaneously generate the CRF model 130 and the Entity Extraction Model 110 is a measurable benefit of the invention in that the time required to complete the generation of the two models will be relatively coextensive and will not cost any additional time for model generation when compared with the prior art. Furthermore, the CRF model 130 does not require a separate set of training documents.

Figure 3:
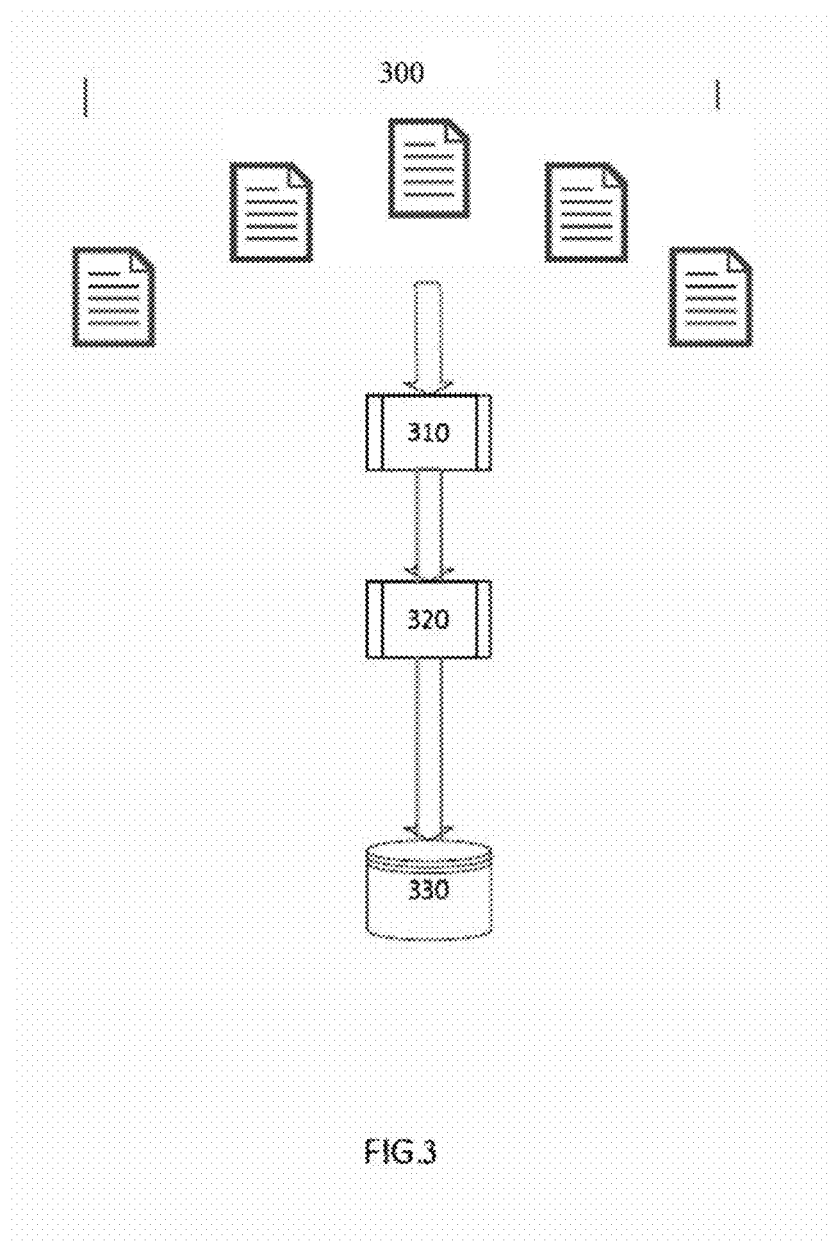
FIG. 3 shows an exemplary natural language processing technique used by embodiments of the invention.

These features of the training text are preferably extracted using natural language processing. Natural language processing algorithms and techniques are generally known in the art, but one way in which this could be implemented is show in FIG. 3, where a plurality of documents to be used as training text 300 is shown for the purposes of generating a data store. The training text samples 300 may be any type of electronic document and in general any computer accessible format such as PDF, text files or HTML text. Each of the training text samples 300 may have different formatting applied to the text therein. A preprocessing module 310 receives the various training text samples 300 and uses known entities or tokens indicative of entities to identify the entities in the training text. The preprocessing module 310 could be one that implements the CRF algorithm 120 of FIG. 2 or the Entity Extraction algorithm 105. The Entity Extraction algorithm 105 is generally known in the art, as described above, so the description that follows will be more specifically applied to a module implementing the CRF algorithm 130.

The rules with which the preprocessing module 310 operates could be user-updated periodically or for specific applications; or alternatively, the preprocessing module 310 could make use of machine learning techniques to update its rules for classifying text, tokens or features. More broadly, text with certain tokens or formatting conditions may be characterized as entities or text containing specific known entities could be extracted from an entity dictionary. Once the text has been classified by the preprocessing module, a data store processing module 320 processes the classified text into a format for storing in the data store 330. Preferably, sentences themselves are extracted and characterized to be stored as a feature in the data store. The final result is the sentences and their context, along with an identifier of sentences having valid entities therein.

In contrast, when the preprocessing module 310 is implementing the Entity Extraction algorithm 105, the final result is a list of individual terms (ie. entities) only. It is understood that there may be two separate and distinct preprocessing modules, one implementing each of the CRF and Entity Extraction algorithms.

Turning back to FIG. 2, once the CRF model 130 and the Entity Extraction model 110 have been generated, these models can be applied to a set of one or more documents 150 being analyzed to identify entities within the set of documents. First, the CRF model 130 is applied to the set of documents 150, with the result being a list of passages 160 having entities therein. This first pass of the documents with the CRF model 130 reduces the number of passages required to be run through the generally more processor intensive Entity Extraction model 110. In addition, the CRF model 130 eliminates ambiguous passages or those passages that that have terms which may not be entities by considering the context of the sentences as a whole. Details of one exemplary CRF model 130 are provided further below. The Entity Extraction model 110 is then applied to the list of passages 160 only and returns an identification of the entities 170 within the documents 150.

In generating the CRF model, a conditional random field is used to represent those passages having an entity as State A and those passages without an entity as State B. Entities are learned from a set of training documents having known entities or based on tokens or features of the text indicative of entities.

While conditional random fields (CRF) are known in the art, and have been used for the purposes of classifying and labeling words or features in text, the present invention differs from the prior art in that complete sentences or sentence fragments including a valid entity are labelled in accordance with conditional random field principles. In addition, tokens of the text or sentences are considered in identifying sentences with valid entities. A CRF estimation is generated for each sentence as its likelihood to belong to the entity being searched for. In addition, the estimation includes a tolerance for words which cannot readily be identified as entities. The CRF training is done through the use of passages of text that contain named entities to be extracted without necessarily being well delimited or guaranteed to contain a named entity. The passage identification serves only to identify passages that are contextually likely to contain a relevant named entity to be identified.

The CRF algorithm may be implemented in any number of ways, but one specific example will now be defined. The input of the algorithm includes specific entities Entity:=$\{entity_1, entity_2, \ldots, entity_m\}$ and a corresponding set of documents D:=$\{d_1, d_2, \ldots, d_m\}$ where m is the number of documents. In addition, each document contains a number of sentences $S_i$:=$\{s^i_1, s^i_2, \ldots, s^i_{ni}\}$ where ni is the number of sentences in document $d_i$. The CRF algorithm of the invention will output to the data store a label for each sentence with a format such as for the jth sentence in the ith document, $s^i_j$, a entity value of $c^i_j \epsilon \{A, B\}$ where, A represents a positive entity match, B represents a negative match (ie. the sentence is considered background having no valid entity therein).

The utility of the algorithm or model is to give a label to each sentence corresponding to whether or not the sentence fits within the category of having an entity.

CRFs generally provide a probabilistic framework for calculating the probability of Y globally conditioned on X, where X is a random variable over sequence data to be labeled, and Y is a random variable over corresponding label sequences. There are various types of CRF models which could be applied, one example of which is illustrated here.

Applying the general CRF framework to the CRF algorithm parameters described above, and given a document containing multiple sentences $S:=\{s_1, s_2, \ldots, s_m\}$ and the corresponding entity label for each sentence Entity:={entity$_1$, entity$_2$, ..., entity$_m$}, the probability of the Entity applied to S, Pr(Entity|S), can be expressed as follows:

$$Pr(\text{Entity}|S) = \frac{1}{Z_S} \exp\left(\sum_{j=1}^{K \times L} F_j(\text{Concept}, S)\right) = \frac{1}{Z_S} \exp\left(\sum_{i=1,k=1}^{m,K} \lambda_k f_k(y_{i-1}, y_i, S) + \sum_{i=1,l=1}^{m,L} \mu_l g_l(y_i, S)\right), \quad (1)$$

Where $Z_s$ is a normalization constant. $f_k(y_{i-1}, y_i, S)$ is an arbitrary feature function over the group of sentences in a document and positions i and i-1. $g_l(y_i, S)$ is a feature function of the state at position i and the document S. These feature functions can describe any aspect of the global characteristics of the sentences, S.

For example, the model could be used to evaluate the feature functions such that f to 1 when $y_{i-1}$ has a label A; 1 when $y_i$ has a label B; 1 when $x_{i-1}$ contains a token of the text indicative of the text belonging to the entity being searched for; 1 when $x_i$ contains a different feature of the text indicative of the entity being searched for; and 0 everywhere else. In addition, g could be evaluated to 1 when $y_i$ has the label A; 1 when $x_i$ contains words indicative of the entity being searched for and no negation words; and 0 elsewhere. Negation words could be those that indicate the context in which the possible entity is used is indicative of it not being an entity.

$\lambda_k$ and $\mu_l$ are positive weights learned from training data for feature functions $f_k$ and $g_l$, reflecting the model's confidence of the corresponding $f_k$ and $g_l$.

The set of weights and parameters in equation 1 is determined via a parameter estimation process learned from the set of training documents. Parameter estimation is generally known in CRF theory and not described in further detail herein.

Based on the conditional probability of the state defined in Equation 1, a label is applied to each sentence as being either part of State A or State B, where State A identifies the sentence including an entity and State B relegates the sentence to background information. All sentences in the document being searched are labelled in this way.

Various features and text of the sentence (as derived from natural language processing (NLP) extraction of individual words and tokens of the text) may be used as inputs to the CRF model to arrive at the label.

The sentences which have been labelled as containing entities are then made available to the Entity Extraction model 110 of FIG. 2 for extracting specific entities and outputting these for storage in an entity database.

For example, consider the set of sentences in a document 400 as shown in FIG. 4. The sentences in the document 400 are shown entirely in lower case to emphasize the application of the invention even in the absence of clearly capitalized entities. Applying the CRF model 130 returns a list of passages 405 with entities 305. The Entity Extraction model 110 is then applied to the list of passages 405 only and returns the list of entities 410. Note that certain sentences having terms that could otherwise have been interpreted as entities have been omitted from the list of passages 305 altogether. Prior art methods would have included all passages (including these passages) for applying the Entity Extraction model, and could very well have returned improper entities.

It will be apparent to one of skill in the art that other configurations, hardware etc. may be used in any of the foregoing embodiments of the products, methods, and systems of this invention. It will be understood that the specification is illustrative of the present invention and that other embodiments within the spirit and scope of the invention will suggest themselves to those skilled in the art.

The aforementioned embodiments have been described by way of example only. The invention is not to be considered limiting by these examples and is defined by the claims that now follow.

What is claimed is:

1. A method for entity extraction within an electronic document, wherein an entity may be a proper noun; the method comprising:

executing by a computer processor a conditional random field algorithm stored on a computer readable medium to generate a conditional random field model; the conditional random field algorithm having an input including one or more training text documents;

executing by a computer processor an entity extraction algorithm stored on a computer readable medium to generate an entity extraction model; the entity extraction algorithm having an input including the same one or more training text documents input into the conditional random field algorithm;

applying by a computer processor the conditional random field model to at least one electronic document; wherein application of the conditional random field model returns a list of sentences in the at least one electronic document having an entity, and storing the list of sentences with a label indicative of having an entity;

applying by a computer processor the entity extraction model to the stored list of sentences with the label indicative of having an entity; wherein application of the entity extraction model returns a list of entities;

storing the list of entities on a computer readable medium;

extracting from the stored list all sentences relating to a specific entity;

wherein the conditional random field model is generated by deconstructing by a computer processor training electronic texts stored on a computer readable into complete sentences and tokens used by the text in each sentence, along with the sequence of sentences; and identifying entities based on either their context within sentences or the tokens used by text in the sentences wherein, given a document containing multiple sentences $S:=\{s_1, s_2, \ldots, s_m\}$ and the corresponding entity label for each sentence Entity:={entity$_1$, entity$_2$, ..., entity$_m$}, the conditional random field function defining the probability of the Entity applied to S, Pr(Entity |S), is expressed as:

$$Pr(\text{Entity}|S) = \frac{1}{Z_S} \exp\left(\sum_{j=1}^{K \times L} F_j(\text{Concept}, S)\right) = \frac{1}{Z_S} \exp\left(\sum_{i=1,k=1}^{m,K} \lambda_k f_k(y_{i-1}, y_i, S) + \sum_{i=1,l=1}^{m,L} \mu_l g_l(y_i, S)\right), \quad (1)$$

where $Z_s$ is a normalization constant $f_k(y_{i-1}, y_i, S)$ is an arbitrary feature function over the group of sentences in a document and positions i and i-1. $g_l(y_i, S)$ is a feature function of the state at position i and the document S.

2. The method according to claim 1, wherein generating the conditional random field model and generating the entity extraction model occur simultaneously from a common set of training texts.

3. The method according to claim 1, wherein applying the conditional random field model generates a probability of a sentence having an entity; wherein the probability includes a tolerance for words which cannot readily be identified as entities.

4. A system for extracting entities from an electronic document, wherein an entity may be a proper noun; the system comprising:
- a computer processor executing a conditional random field algorithm stored on a computer readable medium to generate a conditional random field model; the conditional random field algorithm having an input including one or more training text documents;
- a computer processor executing an entity extraction algorithm stored on a computer readable medium to generate an entity extraction model; the entity extraction algorithm having an input including the same one or more training text documents input into the conditional random field algorithm;
- a computer processor applying the conditional random field model to at least one electronic document; wherein application of the conditional random field model returns a list of sentences in the at least one electronic document having an entity, and storing the list of sentences with a label indicative of having an entity;
- a computer processor applying the entity extraction model to the stored list of sentences with the label indicative of having an entity; wherein application of the entity extraction model returns a list of entities;
- a data store for storing the list of entities on a compute readable medium;
- a computer processor extracting from the stored list all sentences relating to a specific entity;

wherein the conditional random field model is generated by deconstructing training electronic texts stored on a computer readable into complete sentences and tokens used by the text in each sentence, along with the sequence of sentences; and identifying entities based on either their context within sentences or the tokens used by text in the sentences wherein, given a document containing multiple sentences $S:=\{s_1, s_2, \ldots, s_m\}$ and the corresponding entity label for each sentence Entity$:=\{entity_1, entity_2, \ldots, entity_m\}$, the conditional random field function defining the probability of the Entity applied to S, Pr(Entity |S), is expressed as:

$$Pr(\text{Entity}|S) = \frac{1}{Z_S}\exp\left(\sum_{j=1}^{K \times L} F_j(\text{Concept}, S)\right) = \frac{1}{Z_S}\exp\left(\sum_{i=1,k=1}^{m,K} \lambda_k f_k(y_{i-1}, y_i, S) + \sum_{i=1,l=1}^{m,L} \mu_l g_l(y_i, S)\right), \quad (1)$$

where $Z_s$ is a normalization constant $f_k(y_{i-1}, y_i, S)$ is an arbitrary feature function over the group of sentences in a document and positions i and i−1.gl($y_i$,S) is a feature function of the state at position i and the document S.

5. The system according to claim 4, wherein generating the conditional random field model and generating the entity extraction model occur simultaneously from a common set of training texts.

6. The system according to claim 4, wherein applying the conditional random field model generates a probability of a sentence having an entity; wherein the probability includes a tolerance for words which cannot readily be identified as entities.

* * * * *